May 30, 1972 E. H. CONDON ET AL 3,666,594
PROCESS FOR PREPARATION OF NONWOVEN FIBROUS WEB-TISSUE LAMINATE
Filed March 30, 1970 2 Sheets-Sheet 1

INVENTORS.
EUGENE H. CONDON
JAMES E. ROBINSON
JAMES H. WILLS
BY
Wolfe, Hubbard, Leydig, Voit & Osann
ATTORNEYS.

May 30, 1972　　E. H. CONDON ET AL　　3,666,594
PROCESS FOR PREPARATION OF NONWOVEN FIBROUS WEB-TISSUE LAMINATE
Filed March 30, 1970　　　　　　　　　　　　2 Sheets-Sheet 2

INVENTORS.
EUGENE H. CONDON
JAMES E. ROBINSON
JAMES H. WILLS
BY
Wolfe, Hubbard, Leydig, Voit & Osann
ATTORNEYS.

United States Patent Office 3,666,594
Patented May 30, 1972

3,666,594
PROCESS FOR PREPARATION OF NONWOVEN FIBROUS WEB-TISSUE LAMINATE
Eugene H. Condon and James E. Robinson, Neenah, and James H. Wills, Appleton, Wis., assignors to Kimberly-Clark Corporation, Neenah, Wis.
Filed Mar. 30, 1970, Ser. No. 23,824
Int. Cl. B32b 7/14
U.S. Cl. 156—291
9 Claims

ABSTRACT OF THE DISCLOSURE

Tissue-fiber laminates are prepared by substantially completely embedding a nonwoven fibrous web in a patterned layer of a plastisol adhesive which is partially embedded in the tissue web. Embedment of the fibrous web in the adhesive is accomplished while the adhesive is in the fluid state but at just about its gel point.

DESCRIPTION OF THE INVENTION

This invention relates to tissue-fiber laminates and their method of manufacture.

Sokolowski (U.S. Pat. 3,327,708 issued July 27, 1967) discloses a process for manufacture of a tissue-fiber laminate in which an open pattern of adhesive is printed on the surface of a tissue web, and a drafted web of synthetic fibers is laid on the surface of the adhesive and bonded to the tissue web. The fibers are bonded and held in alignment on the surface of the tissue web by partial embedment in the pattern of adhesive. This process is intended for making nonwoven end use products, and, in order to provide a product with a smooth body-contacting fiber surface, it was regarded as important to maintain the surface of the fiber layer substantially free from exposed adhesive due to penetration through the fiber layer. The fibers, therefore, were pressed into the surface of the adhesive to secure embedment without causing penetration of the adhesive through the fiber layer to the surface thereof.

Cross-laid products using several tissue-fiber laminates of the Sokolowski type are disclosed in U.S. Pat. 3,484,330. In the cross-laid product, the tissue layers are exposed on both outer surfaces and the fiber layers are in face to face contact on the inside of the two ply assembly. Additional products prepared from tissue-fiber laminates are disclosed in copending application Ser. No. 551,605, filed May 20, 1966, now U.S. Patent 3,553,064. With the advent of products wherein the fiber layers are buried within and not exposed on the surface, it was found that improved strength characteristics of the product could be obtained by using tissue-fiber laminates wherein the fiber layers are substantially completely embedded in the adhesive pattern below the surface of the adhesive. The problem however, is to obtain substantially complete fiber penetration and embedment in a commercially feasible manner without detrimentally affecting laminate strength or appearance.

Accordingly, the main object of the present invention is to provide an economically attractive process for laminating a nonwoven fiber web to an adhesive printed tissue web which obtains substantially complete embedment of the fibers in the adhesive without sacrificing laminate strength or appearance. A related object is to provide a process for preparing such laminates with a very desirable hand.

It is a further object to provide a process which is suitable for preparing laminates as above-described wherein the nonwoven fiber web is very tenuous.

Other objects and advantages will become apparent upon reading the following detailed description and upon reference to the drawings, in which.

Briefly, the process described herein is useful for preparing tissue-fiber laminates comprised of a web of nonwoven fibers and a web of tissue. The process involves contacting a nonwoven fibrous web with a tissue web containing, on the contacting surface thereof, a pattern of plastisol adhesive, and securing the fibrous web to the tissue web by substantially completely embedding the fibers in the adhesive while the adhesive is still in the fluid state, but close to its gel point. After embedment, the adhesive is gelled and fused.

Figure 1:
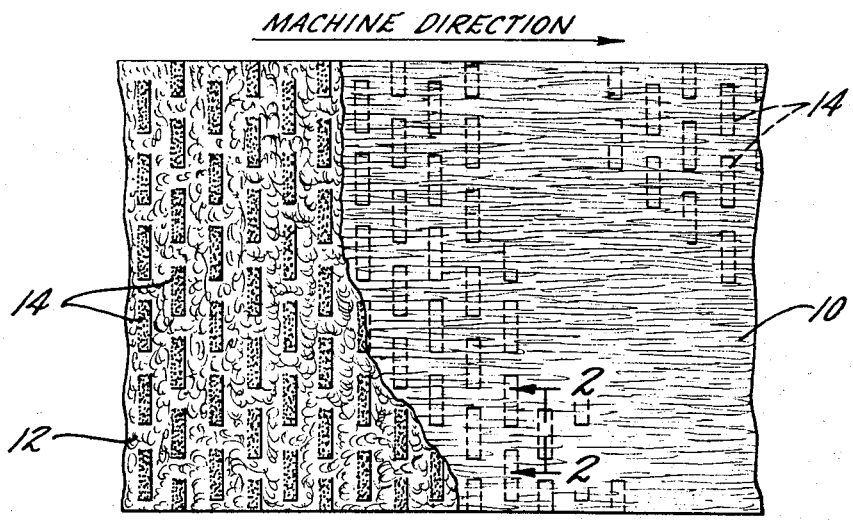
FIG. 1 is a fragmentary plan view of a tissue-fiber laminate prepared by the present process with sections of individual layers broken away.
Figure 2:
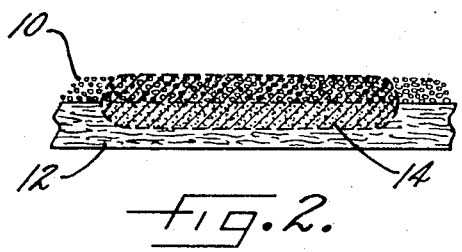
FIG. 2 is a cross-sectional view of the laminate of FIG. 1 taken along line 2—2.

Turning now to the drawings, FIG. 1 illustrates a tissue-fiber laminate prepared according to the present process. The laminate contains a top layer of oriented, staple length fibers 10 adhesively bonded to a bottom layer of tissue 12 by means of an adhesive 14 deposited in a spaced pattern on the tissue layer. The area occupied by the adhesive should be not more than about 25%, and preferably not more than about 15% of the area of the tissue. The adhesive is applied in an amount of about 4–8, and preferably about 5–7, grms./yd.². As shown in FIG. 2, the adhesive has penetrated into, but not through, the tissue layer, and the fibers in the fiber layer are substantially completely embedded in the adhesive over the area of original contact between the fiber layer and the patterned adhesive.

Nonwoven fiber webs prepared either from continuous or staple length fibers and tissue webs useful in the present process are well known. Particularly suitable are those disclosed in the earlier mentioned U.S. Pats. 3,327,708 and 3,484,330 and application Ser. No. 551,605. Therein, oriented fiber webs of drafted staple length fibers and tissue webs of cellulose wadding are shown. However, other nonwoven fibrous webs such as those prepared by carding, garnetting or air laying and continuous filament webs such as prepared in U.S. Pat. 3,341,374 and 3,338,992 can also be used. Similarly tissue webs other than cellulose wadding,such as those of cotton or rayon fibers, can also be employed.

The basis weight of the webs employed herein is not particularly important so long as heat transfer can be achieved through the laminate at a reasonable rate. In general, the tissue web will have a weight of about 10–25, and preferably about 10–25, grms./yds.². The fibrous web generally has a weight of about 2.5–10, and preferably about 3–6, grms./yd.².

Plastisol type adhesives (which term includes organosols with up to about 20% solvent) are preferred for use herein, and representative species of such are disclosed in the above-mentioned patents and application. Principle requirements of the plastisol are that it be fusable in a temperature which is not detrimental to either the tissue or fiber component of the laminate and that it have a suitable application viscosity. Vinyl chloride plastisols which contain vinyl chloride polymers or copolymers and organic phthalate, sebacate, adipate, or phosphate plasticizers are particularly suitable. As described in TAPPI 50 (1), 79A–84A, at low temperatures, plastisols are fluids comprising vinyl resin particles uniformily distributed in a continuous phase of plasticizer. As the plastisol is heated, the plasticizer is absorbed into the resin particles, thus swelling them. Eventually, all the plasticizer is absorbed. The temperature at which such occurs is termed the gel point. On further heating, the swelled resin particles begin to lose their particulate identity and eventually a continuous plastic phase evolves. Such occurs at a temperature termed the fusion point and, in such condition, the plastisol is said to be fused. On cooling, the fused plastisol exhibits very desirable tensile strength characteristics and is quite flexible.

Figure 3:
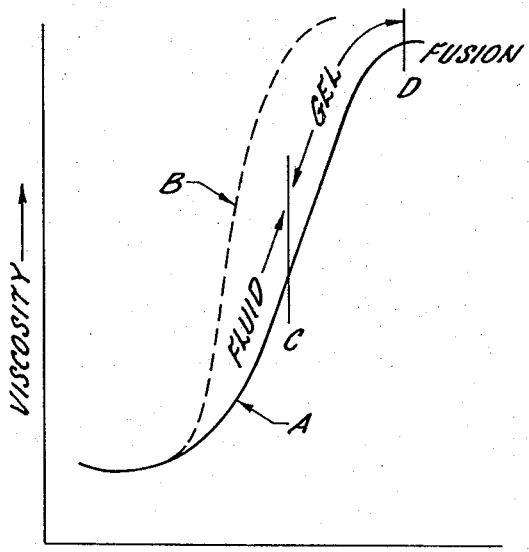
FIG. 3 is a graphical representation of the change in viscosity of a plastisol adhesive as a function of temperature.

FIG. 3 illustrates the viscosity-temperature characteristics of a plastisol, A, with C and D indicating the gel and fusion points, respectively. Ordinarily gelling occurs at about 140–220° F. and fusion at about 280–350° F. The gel point for a particular plastisol can be determined by the hotbench test method described in "Plastics Technology" October 1960, pp. 43–47. The dotted line in FIG. 3 illustrates the viscosity-temperature characteristics of another plastisol, B. As is evident, plastisol B fuses faster than plastisol A, i.e., fusion can be obtained with a smaller temperature increase. Plasticizer selection can be used to establish an appropriate fusion rate.

Figure 4:
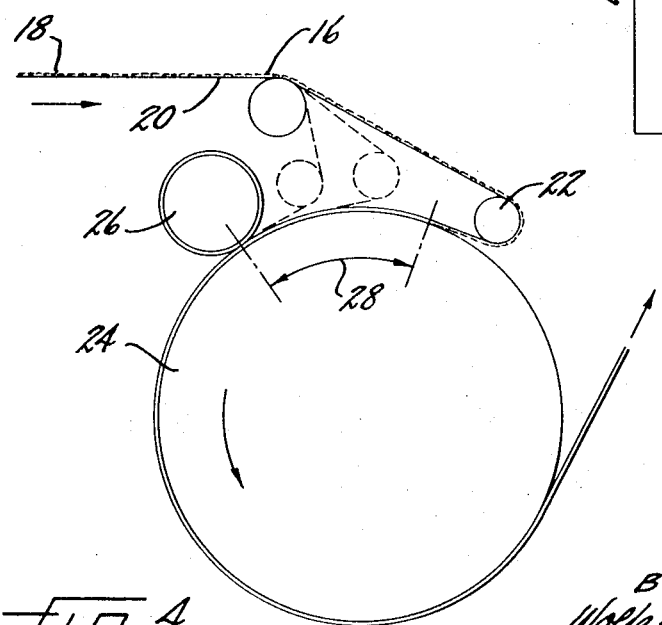
FIG. 4 is a schematic representation illustrating a manner in which the present process can be accomplished.

FIG. 4 illustrates a manner in which the present process can be accomplished. Therein, an unsecured sheet material 16 comprised of a top layer of nonwoven fibers 18 and a bottom layer of an adhesively printed tissue web 20 is conveyed around an adjustable prewrap roll 22, and onto the surface of a driven heated roll 24; the fiber layer being in contact with the roll surface. On contact with the roll, the adhesive is in the fluid state. Thereafter, the sheet is conveyed on the roll surface into the nip formed by the roll 24 and the illustrated squeeze roll 26. Nip pressures of about 15–70 p.l.i. are useful while pressures of 50–60 are preferred. Immediately prior to entering the nip, the adhesive is still in the fluid state, though at about the gel point C in FIG. 3. In such a condition, the adhesive has a viscosity of about $10^4$–$10^5$ centipoise. Passage through the nip serves to substantially completely embed the fibers in the adhesive, and on leaving the nip the adhesive has preferably passed through its gell point. Thereafter, the sheet is conveyed on the roll until the adhesive is substantially fused (Condition D in FIG. 3) at which point it has a viscosity of about $10^6$–$10^7$ centipoise.

In accomplishing the present process it is important that the fibers be embedded in the adhesive while the adhesive is still fluid, i.e., the adhesive has not passed through its gel point. In a fluid state the adhesive offers little resistance to fiber penetration and, accordingly, substantially complete embedment can be achieved without extraordinarily high nip pressure. On the other hand, during fiber embedment, the adhesive should be at a temperature near the gel point. Such can be important for several reasons. First, since the adhesive viscosity increases as the gel point is approached, there is less likelihood that the adhesive will "strike through" the tissue web on fiber embedment, or that the deposited pattern of adhesive will be distorted so as to adversely affect laminate hand or feel. Secondly, since adhesive gel tends to "lock in" the embedded fibers, rapid gelling minimizes the tendency for the fibers to become dislodged on subsequent sheet movement. Of course, the nearer the adhesive is to the gel point when embedment occurs, the more rapidly the subsequent transformation can be accomplished. This latter feature is particularly important when the nonwoven fibrous web is very tenuous such as a drafted fiber web. In order to preserve the characteristics of the web resulting from fiber orientation it is important that the fibers be securely held in the adhesive.

In order to achieve fiber embedment at an appropriate adhesive temperature and thus viscosity (i.e., at about the gel point), the position of the prewrap roll 22 in FIG. 4 can be adjusted so as to vary the length of contact 28 between the sheet and the roll 24 before the sheet enters the nip. Thus, for a given drum temperature and conveying speed, the adhesive temperature at the nip will vary directly with the contact length. If the contact length is too long, the laminate will usually be deficient in strength, principally due to incomplete fiber embedment, and there will be poor ply attachment. If the length is too short, adhesive "strike through" and spreading will occur, principally due to low adhesive viscosity during pressure application. "Strike through" is particularly bad since it not only adversely affects appearance, but additionally results in adhesive build-up on the roll 26.

In practice, for a given web speed, roll temperature, and plastisol type, the appropriate contact length can be established by starting with a long pre-nip contact length and progressively shortening the length until adhesive collection on the squeeze roll is noticed. This is evidence of "strike through" and indicates that the pre-nip contact length is too short. Subsequently, the contact length can be progressively lengthened until the contact length for maximum laminate strength is obtained.

Laminate strength can be measured by using an Instron machine. For oriented fiber webs of staple length fibers the strength is reported as the laminate bonding efficiency, which is obtained by dividing the tensile strength of the laminate measured with a jaw separation of about 0.5 inch longer than the longest of the oriented fibers by the tensile strength of the laminate measured with substantially no jaw separation. A crosshead speed of about 2 inches per minute is used for the measurement with no separation. A bonding efficiency of 1 is ideal. The bonding efficiency of the laminates prepared according to the aforementioned Sokolowski patent is rarely above 0.7. With the present process, laminates with bonding efficiencies of 0.7–0.95, and generally at least 0.85, can be obtained in combination with desirable aesthetic characteristics. On occasion, efficiencies of higher than 0.95 can also be achieved.

Figure 5:
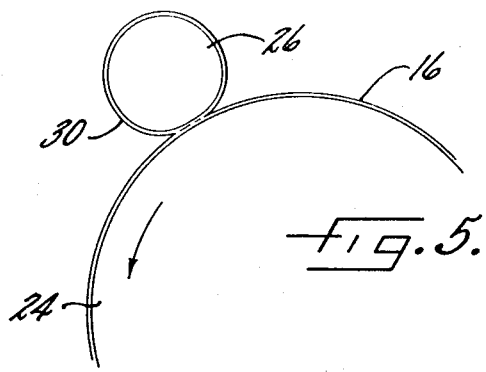
FIG. 5 is an enlarged view of the area of contact between the squeeze roll and heated drum of FIG. 4.

As indicated earlier, rapid gelling of the adhesive after fiber embedment minimizes the chance that the fibers will subsequently become dislodged from their position of substantially complete embedment in the adhesive or their orientation otherwise distorted. Most desirably, adhesive gelling occurs while the laminate is still under the pressure utilized to effect fiber embedment or at least substantially immediately after pressure release. Such desired continuous pressure can conveniently be achieved by using a squeeze roll which contains, on the surface thereof, a resilient elastomeric material, e.g., silicon rubber or "Viton." As shown in FIG. 5, on pressure contact, the resilient material 30 spreads out and conforms to the surface of the roll 24, and thus presses the sheet material to the roll surface for an extended length of travel. If, on entering the nip, the adhesive is at a temperature very near its gel point, the added travel length provided by the squeeze roll's resiliency gives the adhesive a chance to gel before it exits from the nip.

Using as starting materials a tissue web having a weight of 13 grms./yd.² and a drafted fiber web having a weight of 4.5 grms./yd.², a tissue fiber laminate can be prepared according to the present process with an apparatus arrangement similar to that shown in FIG. 4, having the specifications given below. A plastisol adhesive of 100 parts polyvinyl chloride resin, 50 parts dioctyl phthalate, and 10 parts mineral spirits was used. It was applied in a brick pattern in an amount of 6.5 grms./yd.$^2$ with 20% coverage.

Heated Roll 24=30 diameter, "Teflon" coated, steam heated, 365° F.
Squeeze Roll=7" diameter, silicon rubber cover with a durometer 60A
Squeeze Roll—Roll 24 nip pressure=50-60 p.l.i.
Conveying Speed=200-700 feet per minute
Sheet contact length with Roll 24 prior to nip=12-30 inches (higher wrap associated with higher speed)

Figure 6:
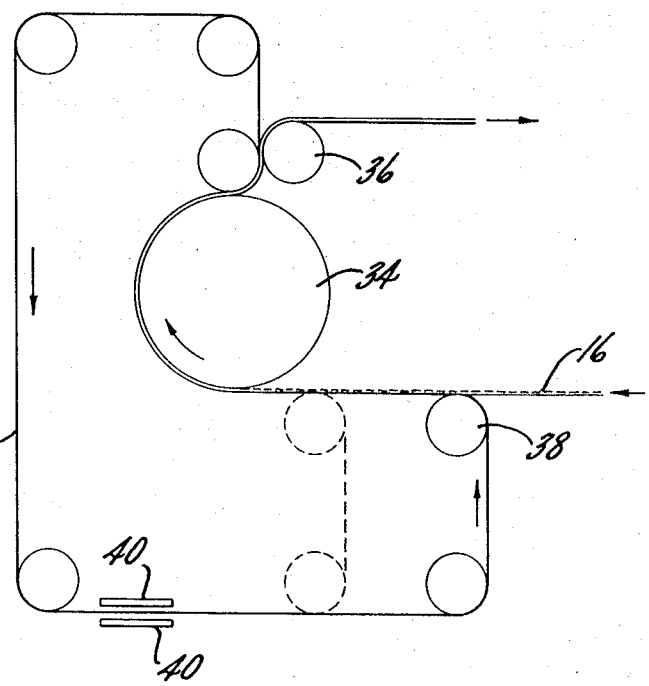
FIGS. 6 and 7 are schematic representations illustrating further manners in which the present process can be accomplished.

FIG. 6 illustrates a further manner in which the present process can be accomplished. As shown, a belt 32 having good surface release properties, e.g., a "Teflon" belt, is employed to hold the unsecured sheet material 16 in contact with the heated roll 34 which, as in FIG. 4, is used for adhesive fusing. The use of the illustrated belt arrangement has several advantages. First of all, since separation of the belt and the laminate does not occur until roll 36, at which time the plastisol adhesive is in a fused state, there is little problem with adhesive build-up on the belt or other apparatus. Secondly, since the belt keeps the laminate in secure contact with the roll over a significant portion of its surface, heat transfer is enhanced and quick fusing achieved. This, of course, permits greater speeds.

With reference still to FIG. 6, the sheet 16 should first contact the belt 32 before contacting the roll 34, such as is illustrated by the position of the roll 38, so as to permit the adhesive to just about reach its gel point prior to coming into contact with the heated roll. In this respect the belt should be at an elevated temperature, either solely from its association with the roll 34 or by independent heating means 40. With the FIG. 6 arrangement, such pre-contact tends to minimize adhesive spreading on pressure contact with the drum. However, since adhesive build-up on a squeeze roll or the like is not a problem with regard to the FIG. 6 arrangement, pre-contact to about the gel point is not as essential as with respect to the FIG. 4 arrangement, and thus the length of pre-contact need not be as crtically controlled. Pre-contact to a point at least near the gel point is however important in obtaining laminates with a good hand and appearance.

Figure 7:
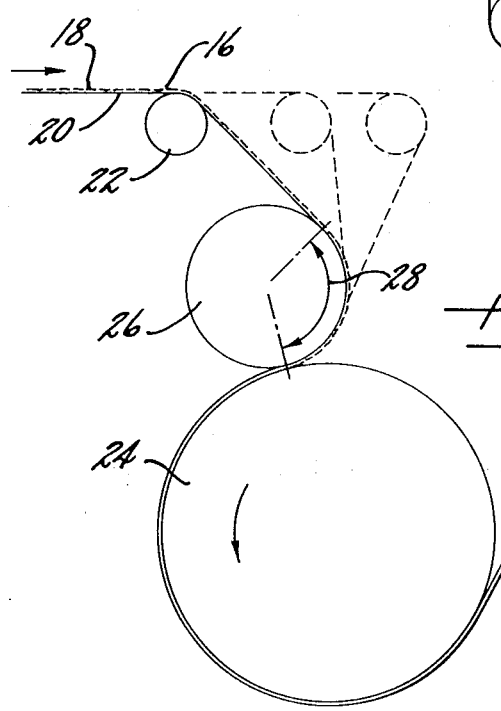

FIG. 7 illustrates a further embodiment of the present invention. Therein, the unsecured laminate 16 is shown to pre-wrap the squeeze roll 26 prior to its passage through the nip between the squeeze roll 26 and the heated roll 24. As with the FIG. 4 embodiment, roll 22 is positioned so as to give the appropriate amount of pre-wrap to place the adhesive at just about its gel point prior to its passage through the nip. With the arrangement depicted in FIG. 7, a squeeze roll of larger diameter than that shown in FIG. 4 is preferably employed since, with such, higher speeds are possible. Also, in order to achieve higher speeds, the squeeze roll 26 is preferably heated by means independent of simply its contact with the heated roll 24.

The use of the FIG. 7 embodiment is particularly desirable in those instances where adhesive "strike through" is felt to be a particularly troublesome problem (e.g., low plastisol application viscosity, low tissue weight, etc.) Since the tissue side of the unsecured laminate is in contact with a heated surface prior to the nip, the temperature gradient across the laminate is in the direction most favorable in preventing "strike through." In other words, the adhesive will have its highest temperature, and thus highest viscosity, in that region nearest the tissue surface.

Thus, as has been seen, tissue-fiber laminates prepared by the process illustrated herein have desirable strength characteristics. The laminates are also quite attractive in appearance and have a good hand, there being no evidence of adhesive "strike through" on the tissue side or adhesive spreading within the laminate.

We claims as our invention:

1. In the process of preparing a tissue-fiber laminate comprising preparing an unsecured laminate by contacting a web of nonwoven fibers with a web of tissue and securing the fiber web to the tissue web by means of a plastisol adhesive partially embedded in the tissue web; the improvement wherein the fiber web is secured to the tissue web by substantially completely embedding the fibers thereof in the plastisol adhesive while the adhesive is still in a fluid state but at about its gel point and, while said fibers are so embedded, gelling and fusing the adhesive.

2. The process of claim 1 wherein the web of nonwoven fibers is a web of drafted staple length fibers.

3. The process of claim 2 wherein the tissue web is a web of cellulose wadding.

4. The process of preparing a tissue-fiber laminate comprising preparing an unsecured laminate by contacting a web of nonwoven fibers with a web of tissue containing on the contacting surface thereof a pattern of a plastisol adhesive in the fluid state, bringing the unsecured laminate into contact with a rotating roll the surface of which is at a temperature above the fusion temperature of the adhesive, substantially completely embedding the fiber web in the adhesive while the adhesive is still in the fluid state but at about its gel point, and conveying the laminate on the surface of the roll to gel and fuse the adhesive.

5. The process of claim 4 wherein, prior to fiber embedment the laminate is in contact with the surface of the roll.

6. The process of claim 5 wherein the adhesive passes through its gel point substantially immediately after fiber embedment.

7. The process of claim 6 wherein the web of nonwoven fibers is a web of drafted, staple length fibers.

8. The process of claim 7 wherein the tissue web is a web of cellulose wadding.

9. The process of preparing a tissue-fiber laminate comprising preparing an unsecured laminate by contacting a web of nonwoven fibers with a web of tissue containing on the contacting surface thereof a pattern of a plastisol adhesive in the fluid state, bringing the unsecured laminate into contact with a rotating roll the surface of which is at a temperature above the gel point of the adhesive and maintaining contact with the roll until the adhesive is at about its gel point, substantially completely embedding the fiber web in the adhesive while the adhesive is in such condition, and thereafter gelling and fusing the adhesive.

References Cited
UNITED STATES PATENTS

| | | | |
|---|---|---|---|
| 2,902,395 | 9/1959 | Hirschy et al. | 156—291 X |
| 3,138,514 | 6/1964 | Florio | 156—291 X |
| 3,327,708 | 6/1967 | Sokolowski | 156—290 X |

CARL D. QUARFORTH, Primary Examiner

E. A. MILLER, Assistant Examiner

U.S. Cl. X.R.

156—277, 295, 324

PO-1050
(5/69)

UNITED STATES PATENT OFFICE
CERTIFICATE OF CORRECTION

Patent No. 3,666,594  Dated May 30, 1972

Inventor(s) Eugene H. Condon, James E. Robinson and James H. Wills

It is certified that error appears in the above-identified patent and that said Letters Patent are hereby corrected as shown below:

In the Claims:

Claim 1, line 3, delete "web of nonwoven fibers" and insert therefor --nonwoven fiber web--.

Claim 2, lines 1 and 2, delete "web of nonwoven fibers" and insert therefor --nonwoven fiber web--.

Claim 4, line 3, delete "web of nonwoven fibers" and insert therefor --nonwoven fiber web--.

Claim 7, lines 1 and 2, delete "web of nonwoven fibers" and insert therefor --nonwoven fiber web--.

Claim 9, line 3, delete "web of nonwoven fibers" and insert therefor --nonwoven fiber web--.

Signed and sealdd this 12th day of December 1972.

(SEAL)
Attest:

EDWARD M. FLETCHER, JR.
Attesting Officer

ROBERT GOTTSCHALK
Commissioner of Patents